US008433269B2

(12) United States Patent
Ridgeway et al.

(10) Patent No.: US 8,433,269 B2
(45) Date of Patent: Apr. 30, 2013

(54) COMPACT SATELLITE ANTENNA

(75) Inventors: Robert Wayne Ridgeway, Saratoga Springs, UT (US); Paul A. Dahl, Pleasant Grove, UT (US)

(73) Assignee: Digi International Inc., Minnetonka, MN (US)

( * ) Notice: Subject to any disclaimer, the term of this patent is extended or adjusted under 35 U.S.C. 154(b) by 252 days.

(21) Appl. No.: 12/917,783

(22) Filed: Nov. 2, 2010

(65) Prior Publication Data

US 2011/0105062 A1 May 5, 2011

Related U.S. Application Data

(60) Provisional application No. 61/257,833, filed on Nov. 3, 2009.

(51) Int. Cl.
*H04B 1/04* (2006.01)

(52) U.S. Cl.
USPC ..................... 455/129; 455/550.1; 455/575.7; 343/872

(58) Field of Classification Search .................. 455/120, 455/121, 129, 550.1, 575.1, 575.5, 575.7; 343/745, 750, 872
See application file for complete search history.

(56) References Cited

U.S. PATENT DOCUMENTS 4,963,098 A 10/1990 Myer et al.
5,576,720 A 11/1996 Gorenz, Jr. et al.
5,779,496 A 7/1998 Bolinger et al.
5,886,590 A 3/1999 Quan et al.
6,166,615 A 12/2000 Winslow et al.
6,388,623 B1 * 5/2002 Sakota et al. .......... 343/700 MS
6,409,550 B1 6/2002 Splichal et al.
6,559,809 B1 5/2003 Mohammadian et al.
6,759,984 B2 7/2004 Wielsma
6,773,286 B1 8/2004 Wu
6,824,419 B1 11/2004 Wu
6,842,143 B2 * 1/2005 Otaka et al. ............ 343/700 MS
7,034,750 B2 4/2006 Asakura et al.

(Continued)

FOREIGN PATENT DOCUMENTS

CN 2482238 3/2002
EP 0856906 A2 8/1998

(Continued)

OTHER PUBLICATIONS

Yanagi, Masahiro, et al., "A Planar UWB Monopole Antenna Formed on a Printed Circuit Board", 1 pg.

(Continued)

*Primary Examiner* — Nhan Le
(74) *Attorney, Agent, or Firm* — Fogg & Powers LLC

(57) ABSTRACT

An apparatus, such as an antenna assembly, can include a flexible dielectric sheet, a first flexible conductor coupled to the flexible dielectric sheet, a second flexible conductor coupled to the flexible dielectric sheet, a matching section electrically coupled to the first and second conductors, and a hollow dielectric housing having a curved interior surface. The first and second flexible conductors can be sized, shaped, and laterally spaced a specified distance from each other to provide a specified input impedance corresponding to a specified range of operating frequencies for use in wireless information transfer between the antenna assembly and a satellite. The first and second flexible conductors can be located along the curved interior surface of the hollow dielectric housing following an arc-shaped path along the curved interior surface.

20 Claims, 10 Drawing Sheets

U.S. PATENT DOCUMENTS

| | | | | |
|---|---|---|---|---|
| 7,339,533 | B2 | 3/2008 | Kurashima et al. | |
| 7,549,886 | B2 | 6/2009 | Herring et al. | |
| 7,853,208 | B2 * | 12/2010 | Washiro | 455/41.1 |
| 7,982,675 | B2 | 7/2011 | Tsujimura et al. | |
| 8,059,045 | B1 * | 11/2011 | Schaffner et al. | 343/718 |
| 2001/0027033 | A1 | 10/2001 | Fujimoto et al. | |
| 2003/0125070 | A1 | 7/2003 | Wagner et al. | |
| 2005/0057404 | A1 | 3/2005 | Demicco et al. | |
| 2005/0099336 | A1 | 5/2005 | Apostolos et al. | |
| 2005/0153749 | A1 | 7/2005 | Falcon et al. | |
| 2006/0001584 | A1 | 1/2006 | Durso et al. | |
| 2006/0002067 | A1 | 1/2006 | Gunderson et al. | |
| 2006/0270279 | A1 | 11/2006 | Heisen et al. | |
| 2007/0024518 | A1 | 2/2007 | Miyoshi et al. | |
| 2007/0105404 | A1 | 5/2007 | Lee et al. | |
| 2007/0120755 | A1 | 5/2007 | Blickle | |
| 2008/0012776 | A1 | 1/2008 | Blickle | |
| 2009/0061685 | A1 | 3/2009 | Lemke et al. | |
| 2009/0117753 | A1 | 5/2009 | Lee et al. | |
| 2009/0149036 | A1 | 6/2009 | Lee et al. | |
| 2009/0149037 | A1 | 6/2009 | Lee et al. | |
| 2011/0215975 | A1 | 9/2011 | Roberts et al. | |

FOREIGN PATENT DOCUMENTS

| | | | |
|---|---|---|---|
| GB | 1104717 | A | 2/1968 |
| WO | WO-9639731 | A1 | 12/1996 |
| WO | WO-99/26316 | A1 | 5/1999 |
| WO | WO-2011/056774 | A2 | 5/2011 |

OTHER PUBLICATIONS

Yang, H.Y. David, "Printed Straight F Antennas for WLAN and Bluetooth", Dept. of Electrical and Computer Engineering, Univ. of Illinois at Chicago, 4 pgs.

"International Application Serial No. PCT/US2010/055066, International Search Report mailed May 11, 2011", 4 pgs.

"International Application Serial No. PCT/US2010/055066, Written Opinion mailed May 11, 2011", 7 pgs.

"U.S. Appl. No. 12/716,657, Final Office Action mailed Aug. 2, 2012", 10 pgs.

"U.S. Appl. No. 12/716,657, Non Final Office Action mailed Jan. 20, 2012", 8 pgs.

"U.S. Appl. No. 12/716,657, Response filed May 21, 2012 to Non Final Office Action mailed Jan. 20, 2012", 12 pgs.

"International Application Serial No. PCT/US2010/055066, International Preliminary Report on Patentability mailed May 18, 2012", 7 pgs.

Herold, David, et al., "Lightweight, High-Bandwidth Conformal Antenna System for Ballistic Helmets", IEEE Military Communications Conference, 2007. MILCOM 2007, http://www.griffithsrf.com/en/pdfdocs/Herold_Griffiths_MILCOM2007.pdf, (2007), 1-6.

Vogel, Martin, et al., "Method for Optimizing a 10 Gb/s PCB Signal Launch", I/Omagazine, DesignCon 2004, http://www.origin.xilinx.com/publications/magazines/io_01/xc_pdf/p60-69_1io-white2.pdf, (Jan. 2005), 60-69.

* cited by examiner

COMPACT SATELLITE ANTENNA

CLAIM OF PRIORITY

This patent application claims the benefit of priority, under 35 U.S.C. Section 119(e), to Ridgeway, U.S. Provisional Patent Application Ser. No. 61/257,833 entitled "COMPACT SATELLITE ANTENNA," filed on Nov. 3, 2009, which is hereby incorporated by reference herein in its entirety.

TECHNICAL FIELD

This document pertains generally, but not by way of limitation, to antennas, and more particularly, to satellite antennas.

BACKGROUND

Information can be wirelessly transferred using electromagnetic waves.

Generally, such electromagnetic waves are either transmitted or received using a specified range of frequencies, such as established by a spectrum allocation authority for a location where a particular wireless device or assembly will be used or manufactured. In some applications, the wireless information transfer can occur between a satellite, and a mobile or stationary transmitter or receiver located terrestrially (e.g., a ground terminal, a ground station, an earth station, a vehicular or aircraft transmitter or receiver, etc.). Generally, due to the large distance between the satellite and the terrestrial terminal, antennas on both sides of the link are configured to provide a relatively high gain, but at the cost of being relatively directional, as compared to antennas designed primarily for terrestrial communication. Additionally, a terrestrially-located antenna configured for satellite communications can be narrow-band, making it more sensitive to changes in the surrounding ground environment, and potentially precluding its use for both uplink and downlink when the uplink and downlink frequency ranges are different.

OVERVIEW

The present inventor has recognized, among other things, that it is difficult to build a compact omni-directional terrestrially-located antenna configured for wireless communication with a satellite. Generally, such terrestrial antennas can be highly directional, bulky, or can have undesired nulls such as in the zenith region or at the horizon (depending on the antenna orientation), preventing reliable communication with satellites in all positions of the sky overhead the antenna. In vehicular or aircraft applications, such as using frequencies from a range of about 30 MHz to 300 MHz (e.g., a VHF range of frequencies), generally available planar antenna designs consume significant area, resulting in a relatively high cost and poor loss performance as compared to other antenna geometries. For example, a generally planar VHF antenna configured for satellite communications can undesirably contribute 2 decibels (dB) or more of loss to the link margin, such as due in part to dielectric losses. Also, such planar VHF antennas can provide only a narrow range of frequencies where the impedance is within an acceptable range, and such a matched range of frequencies can shift undesirably in response to temperature changes or the antenna's position with respect to the surrounding ground environment. Such a surrounding ground environment can include or can be influenced by a metal or conductive skin of a vehicle or aircraft located in proximity to the antenna or its housing.

Thus, the present inventor has also recognized that a terrestrial antenna configured for satellite communications, such as including VHF frequencies, can include a first and second conductor, such as following an arc-shaped or curved path along the interior surface of a hemispherically-shaped dielectric enclosure (e.g., a radome). Such a curved antenna configuration can provide nearly horizon-to-horizon coverage without an undesirable null at or near a zenith region or at the horizon, unlike a purely planar antenna configuration. The present inventor has also recognized that such a conformal antenna can include a matching structure, such as a coplanar waveguide, that can reduce an influence of the surrounding ground or return environment on the antenna's input impedance or usable range of operating frequencies. The present inventor has also recognized that dielectric materials, such as a flexible printed circuit board material, can have a lower dielectric loss and thickness when used a portion of an antenna dielectric substrate, both reducing cost and losses associated with the antenna assembly as compared to a rigid planar antenna configuration.

Example 1 includes subject matter (such as an apparatus) comprising a flexible dielectric sheet, a first flexible conductor coupled to the flexible dielectric sheet, a second flexible conductor coupled to the flexible dielectric sheet, a matching section electrically coupled to the first and second conductors, a hollow dielectric housing having a curved interior surface. In Example 1, the first and second flexible conductors can be sized, shaped, and laterally spaced a specified distance from each other to provide a specified input impedance corresponding to a specified range of operating frequencies for use in wireless information transfer between the antenna assembly and a satellite, when the first and second flexible conductors are electrically coupled to a wireless communication circuit via the matching section. In Example 1, the dielectric sheet and the first and second flexible conductors can be located along the curved interior surface of the hollow dielectric housing following an arc-shaped path along the curved interior surface.

In Example 2, the subject matter of Example 1 can optionally include a curved interior surface of the dielectric housing comprising a hemispherical shell.

In Example 3, the subject matter of one or any combination of Examples 1-2 can optionally include a dielectric housing comprising a material having a relative dielectric constant greater than air.

In Example 4, the subject matter of one or any combination of Examples 1-3 can optionally include a flexible dielectric sheet, and the first and second flexible conductors, comprising a flexible printed circuit board assembly.

In Example 5, the subject matter of one or any combination of Examples 1-4 can optionally include a matching section comprising a discrete component electrically and mechanically coupled to the flexible printed circuit board assembly.

In Example 6, the subject matter of one or any combination of Examples 1-5 can optionally include a flexible dielectric sheet including a polyimide film.

In Example 7, the subject matter of one or any combination of Examples 1-6 can optionally include a printed circuit board assembly adhesively coupled to the interior of the dielectric housing.

In Example 8, the subject matter of one or any combination of Examples 1-7 can optionally include a matching section comprising a coplanar waveguide.

In Example 9, the subject matter of one or any combination of Examples 1-8 can optionally include a coplanar waveguide configured to be about an eighth of a wavelength long, the wavelength corresponding to an effective dielectric constant including a contribution from the flexible dielectric sheet and the hollow dielectric housing.

In Example 10, the subject matter of one or any combination of Examples 1-9 can optionally include a specified range of frequencies within a VHF range of frequencies between about 30 MHz and about 300 MHz.

In Example 11, the subject matter of one or any combination of Examples 1-10 can optionally include a specified range of frequencies comprising a range from about 135 MHz to about 150 MHz.

In Example 12, the subject matter of one or any combination of Examples 1-11 can optionally include one or more of the lateral distance between the first and second conductors, a length of the first conductor, or a length of the second conductor specified to provide a double-resonant response, including a first resonance corresponding to a specified uplink frequency, and a second resonance corresponding to a specified downlink frequency.

In Example 13, the subject matter of one or any combination of Examples 1-12 can optionally include a first flexible conductor includes a first trace comprising a center portion of a coplanar waveguide, a second conductor comprising a first and a second region, each region respectively located laterally adjacent to the first trace and symmetric about an axis following the first trace to provide respective coplanar return conductors adjacent to the center portion of the coplanar waveguide, the second conductor including a first and a second conductive flap, each conductive flap respectively electrically coupled to the respective first or second region via respective traces.

In Example 14, the subject matter of one or any combination of Examples 1-13 can optionally include a first flexible conductor including a distally-located third flap at the end of the first flexible conductor opposite the matching section.

In Example 15, the subject matter of one or any combination of Examples 1-14 can optionally include one or more of the first, second, or third flaps comprising a cut-away portion configured to adjust an input impedance corresponding to a specified range of frequencies used for wireless information transfer.

In Example 16, the subject matter of one or any combination of Examples 1-15 can optionally include a connector assembly configured to provide an electrical and mechanical connection between the antenna assembly and a wireless communication circuit, the connector assembly electrically coupled to the matching structure, and a rigid dielectric material mechanically attached to the portion of the dielectric sheet located at or near the connector assembly, the rigid dielectric material configured to mechanically anchor at least a portion of the dielectric sheet and connector assembly.

In Example 17, the subject matter of one or any combination of Examples 1-16 can optionally include one or more of the first or second flexible conductors configured to electrically connect the antenna assembly to the communication circuit board assembly using a direct board-to-board interconnect without requiring a connector assembly between the antenna assembly and the communication printed circuit board assembly.

Example 18 includes subject matter (such as an apparatus) comprising an antenna assembly, including a flexible dielectric sheet, a first flexible conductor coupled to the flexible dielectric sheet, a second flexible conductor coupled to the flexible dielectric sheet, a matching section electrically coupled to the first and second conductors, a hollow dielectric housing having a curved interior surface, a wireless communication circuit electrically coupled to the antenna assembly via the matching section, the wireless communication circuit configured to transfer information wirelessly between the apparatus and a satellite, within a specified range of operating frequencies, using the antenna assembly. In Example 18, the first and second flexible conductors can be sized, shaped, and laterally spaced a specified distance from each other to provide a specified input impedance corresponding to the specified range of operating frequencies. In Example 18, the dielectric sheet and the first and second flexible conductors can be located along the curved interior surface of the hollow dielectric housing following an arc-shaped path along the curved interior surface, and the flexible dielectric sheet, and the first and second flexible conductors comprise a flexible printed circuit board assembly.

Example 19 can include, or can optionally be combined with the subject matter of one or any combination of Examples 1-18 to include, subject matter (such as a method, a means for performing acts, or a machine-readable medium including instructions that, when performed by the machine, cause the machine to perform acts) comprising forming an antenna assembly, including forming a first flexible conductor and a second flexible conductor, and coupling the first and second flexible conductors to a dielectric sheet. Example 19 can include attaching the antenna assembly to a curved interior surface of a hollow dielectric housing, the first and second flexible conductors sized, shaped, and laterally spaced a specified distance from each other to provide a specified input impedance corresponding to a specified range of operating frequencies for use in wireless information transfer between the antenna assembly and a satellite when the antenna assembly is coupled to a wireless communication circuit via a matching structure. In Example 19, the dielectric sheet and the first and second flexible conductors can be located along the curved interior surface of the hollow dielectric housing following an arc-shaped path along the curved interior surface.

In Example 20, the subject matter of Example 19 can optionally include electrically coupling the antenna assembly to the wireless communication circuit via the matching structure, and wirelessly transferring information between the antenna and a satellite using the specified range of frequencies.

Example 21 includes subject matter (such as an apparatus) comprising an antenna assembly, including a flexible dielectric sheet, a first flexible conductor coupled to the flexible dielectric sheet, a second flexible conductor coupled to the flexible dielectric sheet. In Example 21, the first flexible conductor can include a first trace comprising a center portion of a coplanar waveguide, the second conductor can include a first and a second region, each region respectively located laterally adjacent to the first trace and symmetric about an axis following the first trace to provide respective coplanar return conductors adjacent to the center portion of the coplanar waveguide. In Example 21, the second conductor can include a first and a second conductive flap, each conductive flap respectively electrically coupled to the respective first or second region via respective traces. In Example 21, the dielectric sheet and the first and second flexible conductors can be configured to be located along a curved interior surface of a hollow dielectric housing, following an arc-shaped path along the curved interior surface.

These examples can be combined in any permutation or combination. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
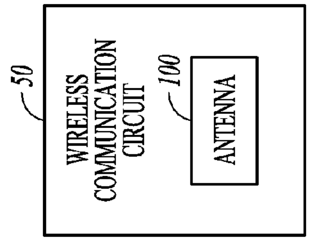
FIG. 1 illustrates generally an example of an apparatus that can include a wireless communication circuit and an antenna.

FIG. 1 illustrates generally an example of an apparatus that can include a wireless communication circuit 50 and an antenna 100. Such an apparatus can be a portion of a satellite communications system, such as a terrestrial terminal located on a vehicle, an aircraft, or at a stationary location. In an example, such an apparatus can wirelessly transmit information to a satellite (e.g., an uplink) or can receive information from a satellite (e.g., a downlink), such as using a range of operating frequencies included in a VHF band from about 30 MHz to about 300 MHz. In an example, the antenna 100 can include an antenna assembly such as shown in the examples of FIG. 2, 6-8, or 11, or one or more other antenna configurations. In an example, the antenna 100 can be configured to resonate or otherwise provide a specified input impedance at one or more operating frequencies located between about 135 MHz and 150 MHz, or including another range of frequencies. In an example, the antenna 100 can be about a quarter of a wavelength long, such as corresponding to a wavelength determined at least in part by an effective dielectric constant of a dielectric material nearby the antenna 100. Such dielectric material can include a substrate on which an antenna 100 conductor is patterned, or a dielectric material comprising a housing in which the antenna is located or mechanically supporting the antenna (e.g., a radome such as a dielectric housing shown in the examples of FIGS. 6 and 11).

Figure 2:
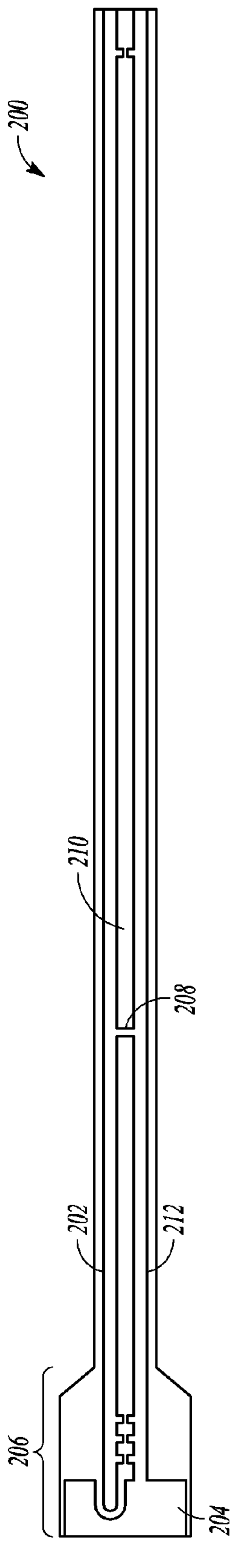
FIG. 2. illustrates generally an example of an antenna assembly including a dielectric sheet, a first conductor, and a second conductor.

FIG. 2. illustrates generally an example of an antenna assembly 200 that can include a dielectric sheet 210, a first conductor 202, and a second conductor 212. In the example of FIG. 2, the antenna 200 can be fed by a radio-frequency interconnect (e.g., a coaxial connector, a printed circuit board land pattern approximating a coaxial configuration, or one or more other interconnects). The region 204 can provide a ground or return structure, such as to stabilize the impedance or minimize an impedance discontinuity at the transition from the antenna assembly 200 to a wireless communication circuit, such as located on a separate printed circuit board assembly. In an example, the first conductor 202 and the second conductor 212 can be flexible, such as adhered or otherwise attached to a flexible dielectric sheet 210. For example, the combination of the first conductor 202, the second conductor 212, and the dielectric sheet 210 can comprise a flexible printed circuit board assembly. In an example, the dielectric sheet can include a polyimide material, a liquid crystal polymer material, or one or more other flexible circuit board materials. Similarly, one or more of the first or second conductors can include copper, aluminum, tungsten, platinum, gold, nickel, or one or more other conductive materials, such as in a foil or film configuration to provide mechanical flexibility.

In an example, use of a dielectric material, such as a polyimide film, for the dielectric sheet 210 can provide lower dielectric loss as compared to using a thicker rigid substrate including a glass epoxy laminate (e.g., FR-4 or one or more other materials generally used for commodity printed circuit board production in consumer devices).

Figure 6:
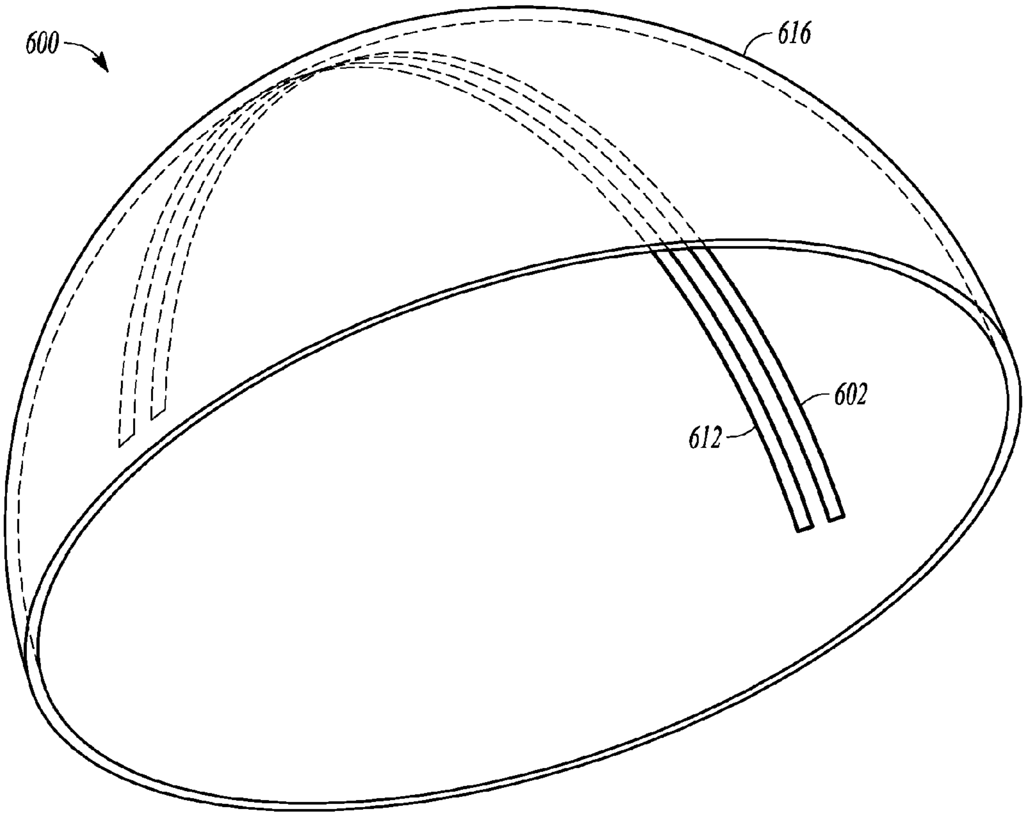
FIG. 6 illustrates generally an example of a dielectric housing including a first and a second flexible conductor located on a curved interior surface of the housing, such as illustrating the antenna configuration of FIG. 2 when conformed to the interior surface of the housing.
Figure 11:
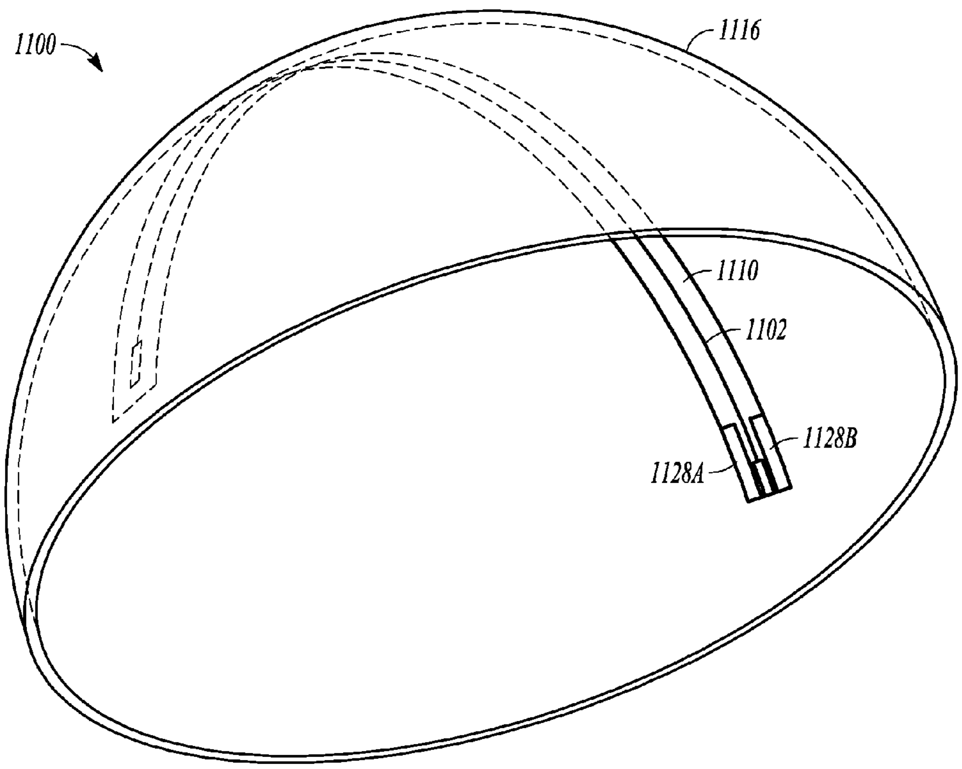
FIG. 11 illustrates generally an example of a dielectric housing including a first and a second flexible conductor located on a curved interior surface of the housing, such as illustrating the antenna configuration of FIG. 7 when conformed to the interior surface of the housing.

In an example, a ground or return plane can be located nearby the antenna assembly 200, such as to provide a reflector or counterpoise when one or more of the first conductor 202 or the second conductor 212 are about a quarter wavelength long, such as shown in the examples of FIG. 6 or 11. For example, in the illustrative example of FIG. 4, the first conductor 202 and second conductor 212 can be sized and shaped to provide two resonant operating frequencies, such as slightly offset in frequency from one another, such as to provide a first frequency range such as for uplink of information to a satellite, or a second frequency range such as for downlink of information from a satellite. A spacing or lateral separation between the first conductor 202 and the second conductor 212 can be used to adjust an input impedance, such as to provide a specified input impedance corresponding to a desired range of operating frequencies, such as including both the first and second frequency ranges. Such a configuration can be called a double-resonant antenna configuration.

In an example, the first conductor 202 or the second conductor 212 can be coupled to a feed from the wireless communication circuit via a matching section in the region 206, such as including one or more discrete (e.g., one or more surface mount components) or distributed matching components (one or more conductor features or gaps on the circuit board assembly, such as including a waveguiding structure). Such a matching structure can be used to adjust the input impedance of the antenna assembly 200 to provide the specified input impedance corresponding to the desired range of operating frequencies, such as including a pi-network of discrete capacitors or inductors. In an example, a shunt stub 208 can be located along the length of the antenna 200, such as to provide another technique of adjusting the input impedance of the antenna, shifting the usable range of operating frequencies towards the desired range, or widening or narrowing the usable bandwidth. In a flexible antenna example, the antenna 200 can be bent or otherwise formed to a curved surface, such as to avoid a null transmission or reception direction along the axis of the antenna or in the plane of the antenna before being bent or otherwise formed. Such a technique can be used to move any nulls below the horizon, providing uninhibited transmission or reception from horizon-to-horizon, such as using the configuration shown in the examples of FIG. 6 or 11.

Figure 3:
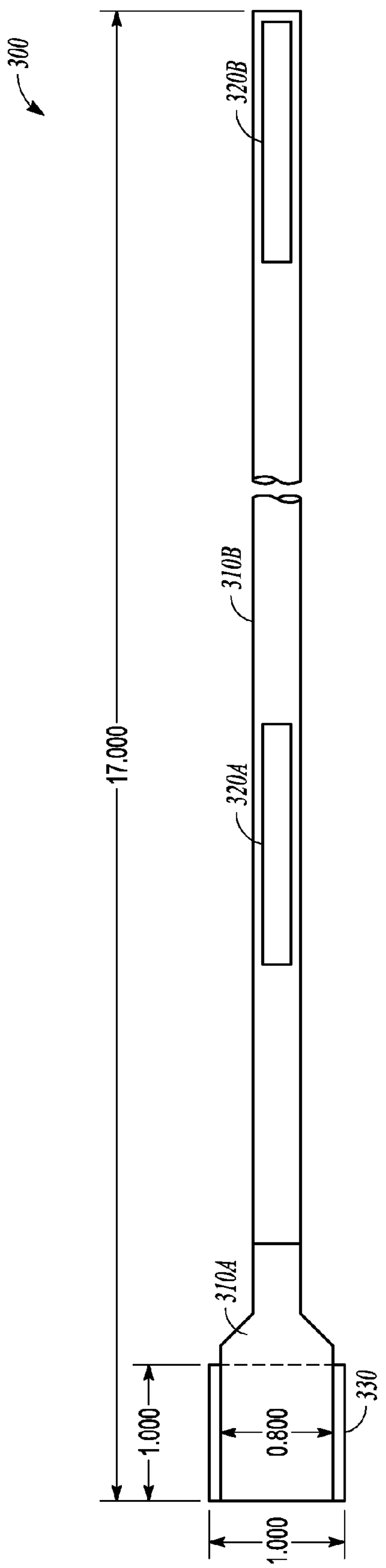
FIG. 3 illustrates generally an example of various dielectric materials, such as included as a portion of example of FIG. 2.

FIG. 3 illustrates generally an example of dimensions and various dielectric materials for an antenna assembly 300, such as included as a portion of example of FIG. 2. In the example of FIG. 3, all units are given in inches. In an example, the antenna assembly 300 can include a rigid backer 330 near the feed region (e.g., in an antenna configuration that is end-fed, such as shown in FIGS. 2-3, 6-8, and 11), such as adhered or otherwise coupled to a flexible dielectric substrate 310A. For example, the substrate 310A can include a polyimide film, such as backed with adhesive, or one or more other materials. In the example of FIG. 3, a dielectric cover layer 310B can cover one or more flexible conductors. The cover layer 310B can include a polyimide material or a solder mask layer, or one or more other materials. The cover layer 310B can include one or more cutouts such as a first cutout 320A or a second cutout 320B, such as to provide access to the first or second conductors 202, 212 shown and discussed in the example of FIG. 2, or to provide access to a location for a shunt stub 208. In an example, the first or second cutouts 320A-B can allow tuning or adjustment of the antenna during manufacturing or in the field, such as via installation of a capacitor, inductor, or a shorting stub (e.g., stub 208) between or along the conductors. Such field tuning of the antenna can be accomplished in response to any "pulling" or other adverse changes to antenna characteristics (input impedance, bandwidth), such as due in part to the actual use environment (e.g., surrounding conductive structures such as a vehicle body or airframe in the near field of the antenna assembly 300). However, the antenna configurations of FIGS. 2-3 can still provide more immunity to the surrounding ground environment than a single quarter-wavelength monopole lacking the second conductor 212. For example, locating the second conductor 212 a specified lateral distance away from the first conductor 210 can stabilize the input impedance and usable frequency range of the antenna, making it less immune to its surrounding ground or return environment than a quarter wavelength monopole.

Figure 7:
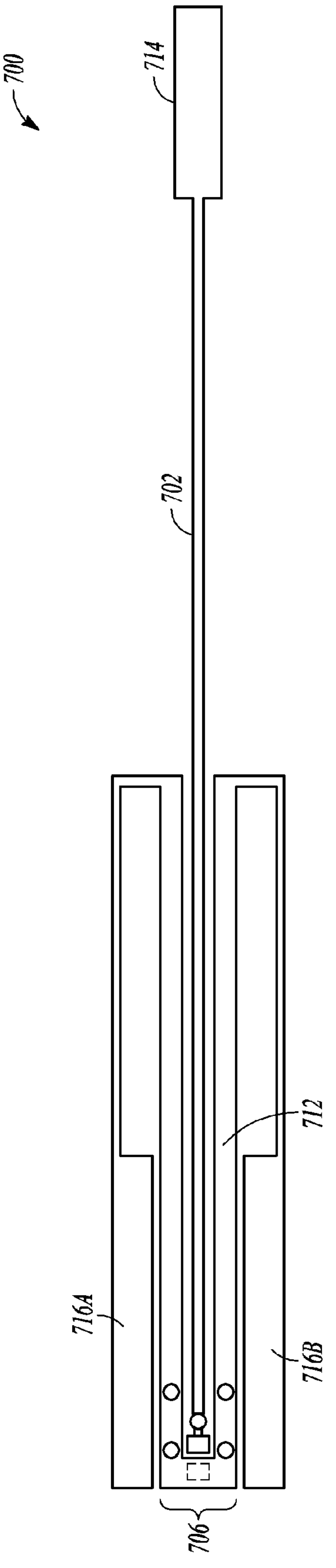
FIG. 7 illustrates generally an example of an antenna assembly including a dielectric sheet, a first conductor, and a second conductor.
Figure 8:
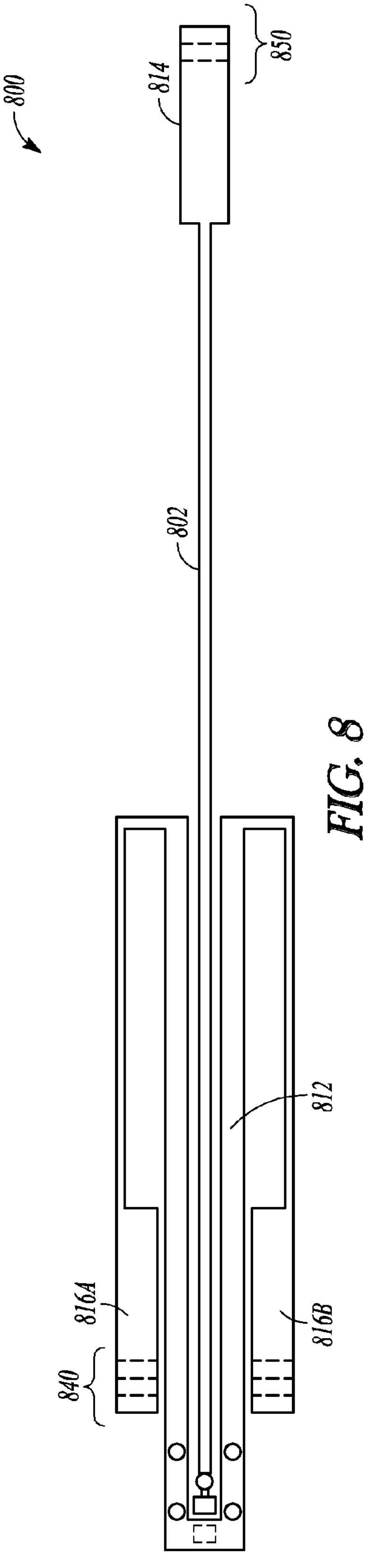
FIG. 8 illustrates generally an example of antenna assembly similar to the antenna assembly of FIG. 7, that can include one or more regions configured for trimming the antenna to adjust an input impedance of the antenna.

In an example, the rigid backer 330 (e.g., FR-4 or another material) can be limited in area to just the region surrounding an RF or other interconnection between the antenna 300 and a wireless communication circuit, either using direct board-to-board contact, or using an RF connector assembly (e.g., a coaxial connector or other interconnection), such as to provide mechanical support for such an interconnect (e.g., using one or more plated through-holes, such as shown in the example of FIGS. 7-8) while still reducing dielectric loss as compared to an all-rigid configuration.

Figure 4:
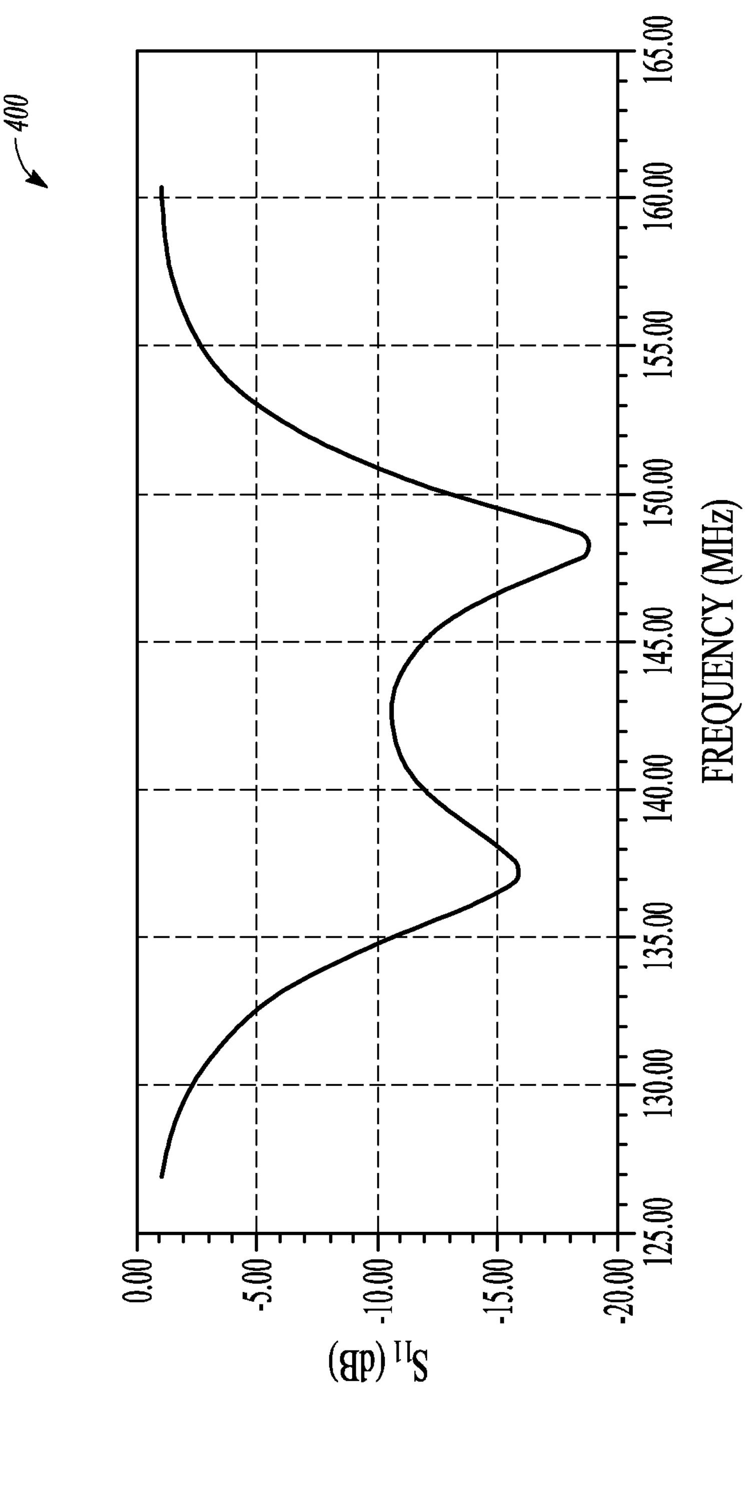
FIG. 4 illustrates generally an illustrative example of a return loss simulated for the antenna configuration of FIG. 2.

FIG. 4 illustrates generally an illustrative example 400 of a return loss (e.g., an $S_{11}$ parameter) simulated for the antenna configuration of FIG. 2. In this illustrative example, a double-dip resonant response is shown, such as corresponding to looping impedance response shown in the Smith Chart of FIG. 5. In the example of FIG. 4, a usable range of frequencies can include a range from less than 135 MHz to more than 150 MHz, such as corresponding to a specified $S_{11}$ parameter of −10 dB or lower (e.g., a return loss of 10 dB, or a voltage standing wave ratio (VSWR) of 2:1 or less), or one or more other values. Such a double-dip resonant response can be achieved such as by adjusting a length of the first conductor 202 to be slightly different than a length of the second conductor 212 (e.g., adjusting the lengths of each conductor independently to correspond to respective desired quarter-wavelength resonant responses). Also, a specified lateral distance between the first and second conductors can be adjusted, such as to adjust one or more of impedance or usable bandwidth. In an example, the usable bandwidth of the antenna can be enhanced (e.g., widened), such as using a matching structure as shown in the example of FIG. 2, such as to provide the return loss plot shown in the illustrative example of FIG. 4.

Figure 5:
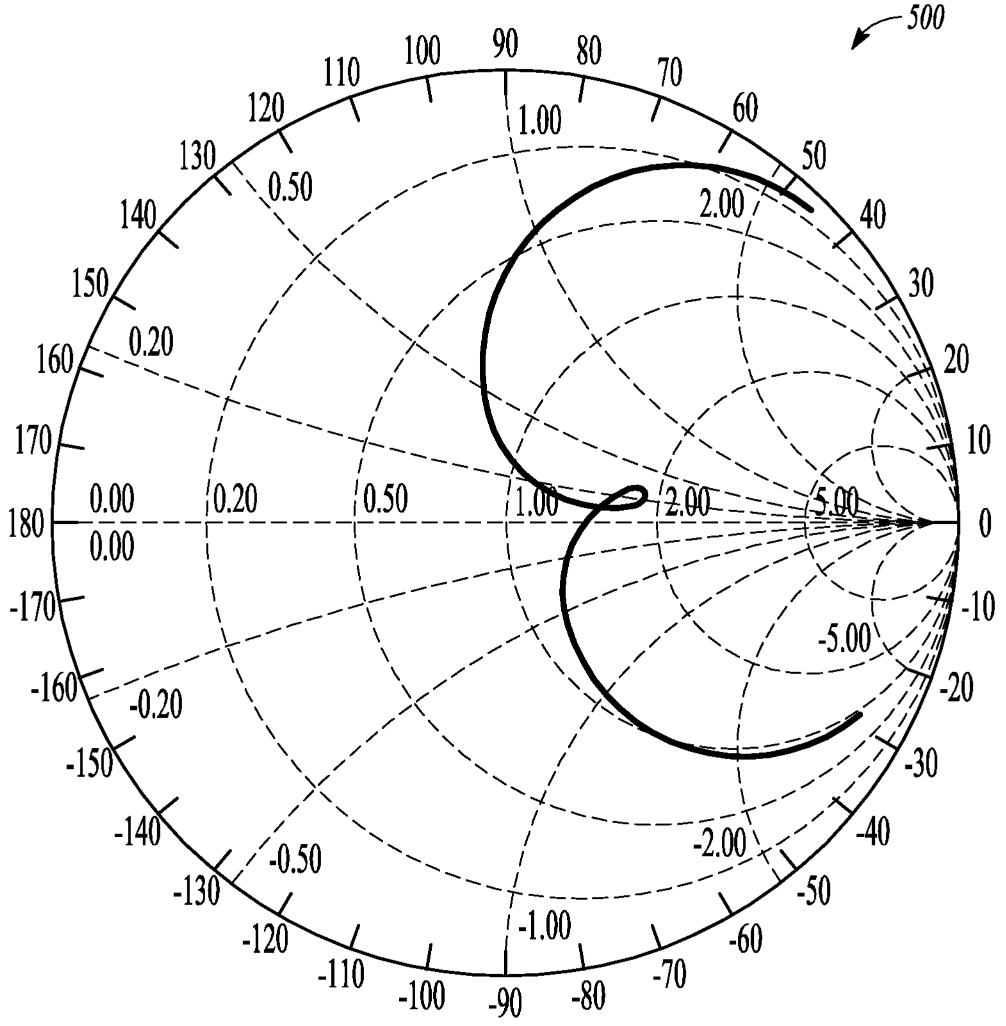
FIG. 5 illustrates generally an illustrative example of an impedance Smith Chart simulated for the antenna configuration of FIG. 2.

FIG. 5 illustrates generally an illustrative example 500 of an impedance Smith Chart simulated for the antenna configuration of FIG. 2. In the example of FIG. 5, a loop in the impedance response can indicate a double-resonant antenna structure, such as shown in the return loss response of FIG. 4. In this example, one or more of a stub location or one or more other parameters can be varied, such as to move the locus of the loop in the impedance closer to the center or unit impedance (e.g., corresponding to 50 ohms real impedance), or to some other desired input impedance to provide a conjugate impedance match to an output of a wireless communication circuit.

FIG. 6 illustrates generally an example 600 of a dielectric housing 616 (e.g., a radome), such as including a first conductor 602 or a second conductor 612 located on a curved interior surface of the housing 616, such as illustrating the antenna configuration of FIG. 2 when conformed to the interior surface of the housing 616. In the example of FIG. 6, the flexible antenna configuration of FIG. 2 can follow an arc-shaped path along the curved interior surface of the housing 616, such as simulated in the illustrative examples of FIGS. 4-5. In this example, such a configuration can provide a radiation pattern including a gain of about −5 dB in all directions from the horizon up to the zenith, such as when a circular base of the housing 616 includes a ground or return plane defining the plane of the horizon. The ground or return plane can be about a quarter of a wavelength in radius, or larger, such as depending on the desired range of operating frequencies for the antenna. The configuration of FIG. 6 can avoid nulls at the zenith or horizon by providing a curved or arcuate shape for the radiating conductors 602 and 612, providing coverage of almost all of the sky overhead the antenna, such as to for use in communication with one or more satellites located overhead, such as pushing any null locations below the horizon as compared to a purely planar configuration.

In an example, the housing 616 can be hemispherical, or otherwise shell-shaped to provide a curved interior surface on which the flexible antenna assembly of FIGS. 2-3 can be adhered. While the term "hemispherical" is used, the housing 616 need not be perfectly spherical, and can include one or more other shapes. In the example of FIG. 6, the housing 616 can provide a mechanical support for the antenna, but other techniques can be used to support the antenna as well. In an example, the dielectric constant of the housing 616 can be higher than air, such as including a low-loss dielectric material.

Because the antenna conductors can radiate through the housing 616, the dielectric material can be selected to both dielectrically load the antenna, while not adversely attenuating the radiated field. For example, the housing 616 can provide an effective dielectric constant nearby the first conductor 602 or the second conductor 612 that is higher than a free space dielectric constant. Such a higher effective dielectric constant allows a quarter wavelength antenna configuration such as shown in FIG. 6 to be shorter (e.g., more compact) than a corresponding free-space quarter wavelength antenna. The use of a low-loss dielectric for the housing 616, and the antenna substrate, such as shown in FIG. 2, can provide an improvement of about 2 dB as compared to using a glass-epoxy laminate such as FR-4 as the dielectric substrate for the antenna. Additionally, use of adhesive-backed dielectric material to affix the antenna conductors 602, 612 to the housing 616 can be cheaper than attaching or supporting a rigid board (e.g., no standoffs or other hardware are required for the flexible antenna configuration).

FIG. 7 illustrates generally an example of an antenna assembly 700 that can include a dielectric sheet, a first conductor 702, and a second conductor 712. The construction and materials of the example of FIG. 7 can be similar to those discussed above in relation to the examples of FIGS. 2-3, such as including a flexible printed circuit board assembly including the first conductor 702 and second conductor 712, along with a first flap 716A connected to a first region of the second conductor 712 via a first trace, and a second flap 716B connected to a second region of the second conductor 712 via a second trace, and a distal flap 714 located opposite a region 706 where the antenna 700 can be fed, such as via a wireless communication circuit. In the example of FIG. 7, a matching structure can include a coplanar waveguide (CPW), such as formed by a portion of the first conductor 702 located laterally between two regions of the second conductor 712. In an example, the two regions of the second conductor 712 can be symmetrically-located return conductors and the first conductor 702 can be a center conductor of the CPW structure. In an example, the matching structure including the CPW can eliminate the need for discrete matching components onboard the antenna 700 assembly, further reducing cost or complexity. For example, the CPW portion of the first conductor, near the second conductor 712, can be about an eighth of a wavelength long.

In an example, the antenna 700 configuration of the examples of FIGS. 7-8 and 11 can be less sensitive to the surrounding ground or return environment than the examples of FIGS. 2-3 and 6, such as because the configuration of FIGS. 7-8 and 11 provides a more "balanced" electromagnetic configuration. Thus, the configuration of FIGS. 7-8 may provide a more consistent resonant operating frequency range or otherwise usable frequency range without field or factory tuning, as compared to the configuration of FIGS. 2-3 and 6, because it can provide comparatively less sensitivity to the surrounding near-field ground or return environment. For example, the inductance per unit length can be increased where the magnitude of an RF current along the antenna 700 is high, as compared to the unbalanced configuration of FIGS. 2-3 and 6. Similarly, where the RF voltage along the antenna 700 is high, the capacitance per unit length can be increased, as compared to the unbalanced configuration of FIGS. 2-3 and 6.

As in the example of FIGS. 2-3, the antenna configurations of FIG. 7-8 can connect to other circuitry, such as a wireless communication circuit, using an RF connector assembly located in the region 706 of the antenna 700, or using a direct board-to-board interconnection (e.g., soldering a land patter or other feature of the antenna 700 directly to a printed circuit board assembly comprising a portion of the wireless communication circuit). The present inventor has also recognized that the balanced configuration of FIGS. 7-8 can be less sensitive to the surrounding ground or return environment than the examples of FIGS. 2-3, and thus a board-to-board connection can desirably eliminate an RF connector assembly while still providing an antenna 700 that is relatively immune to mounting configuration or surrounding conductors.

FIG. 8 illustrates generally an example of antenna assembly 800 similar to the antenna assembly of FIG. 7, that can include one or more regions configured for trimming the antenna to adjust an input impedance of the antenna 800. Similar to the balanced configuration of FIG. 7, the antenna assembly 800 of FIG. 8 can include a first conductor 802, such as laterally-sandwiched between two regions of a second conductor 812 to form a CPW region of the antenna 800, such as corresponding to about an eighth of a wavelength. The two regions of the second conductor 812 can be connected to or otherwise form respective flaps, including a first flap 816A and a second flap 816B, such as connected to the larger are of the second conductor 812 via traces at the end of the CPW region. In the example of FIG. 8, similar to FIG. 7, the first conductor 812 (e.g., the center trace of the CPW) can continue along the surface of the antenna 800 beyond the CPW region, terminating in a third distally-located flap 814. In an example, such as shown in FIG. 8, one or more cut-away portions or notches can be included in the first or second flaps 816A-B, such as in a region 840, or in the third flap 814, such as in a region 850. Such notches or other indicia on the conductive flaps can provide a position to cut the flaps shorter, such as during manufacturing, during development, or in the field, such as to adjust a resonant frequency or impedance-matched range of frequencies to the achieve the desired operating frequency range (e.g., to move a center frequency or return loss minimum to a desired center frequency). Such indicia can eliminate or reduce the need for precision measurements of the trimmed length of one or more flaps to determine a desired flap length to provide a particular impedance within a particular range of frequencies, and can be used to quickly fine-tune the antenna assembly 800 in a particular product or mounting configuration.

Figure 9:
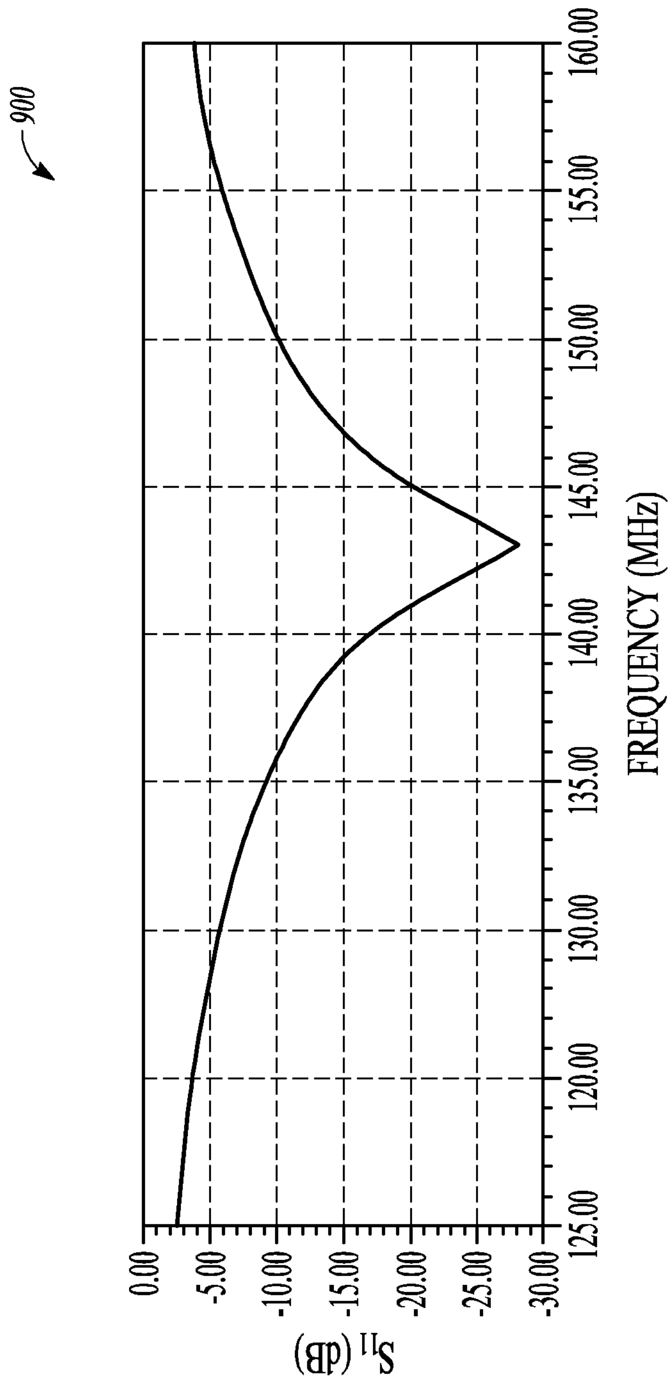
FIG. 9 illustrates generally an illustrative example of a return loss simulated for the antenna configuration of FIG. 8.

FIG. 9 illustrates generally an illustrative example of a return loss 900 simulated for the antenna configuration of FIG. 8. In the example of FIG. 9, a usable range of frequencies can include a range from less than 135 MHz to more than 150 MHz, such as corresponding to a specified $S_{11}$ parameter of −10 dB or lower (e.g., a return loss of 10 dB or more, or a voltage standing wave ratio (VSWR) of 2:1 or less), or one or more other values, such as similar to the simulated return loss for the configuration of FIGS. 2-3, as shown in FIG. 4. As discussed in the examples above, adjusting the length of one or more of the first or second conductors or an overall antenna length can shift the resonant frequency to a desired center frequency within a desired range of frequencies.

Figure 10:
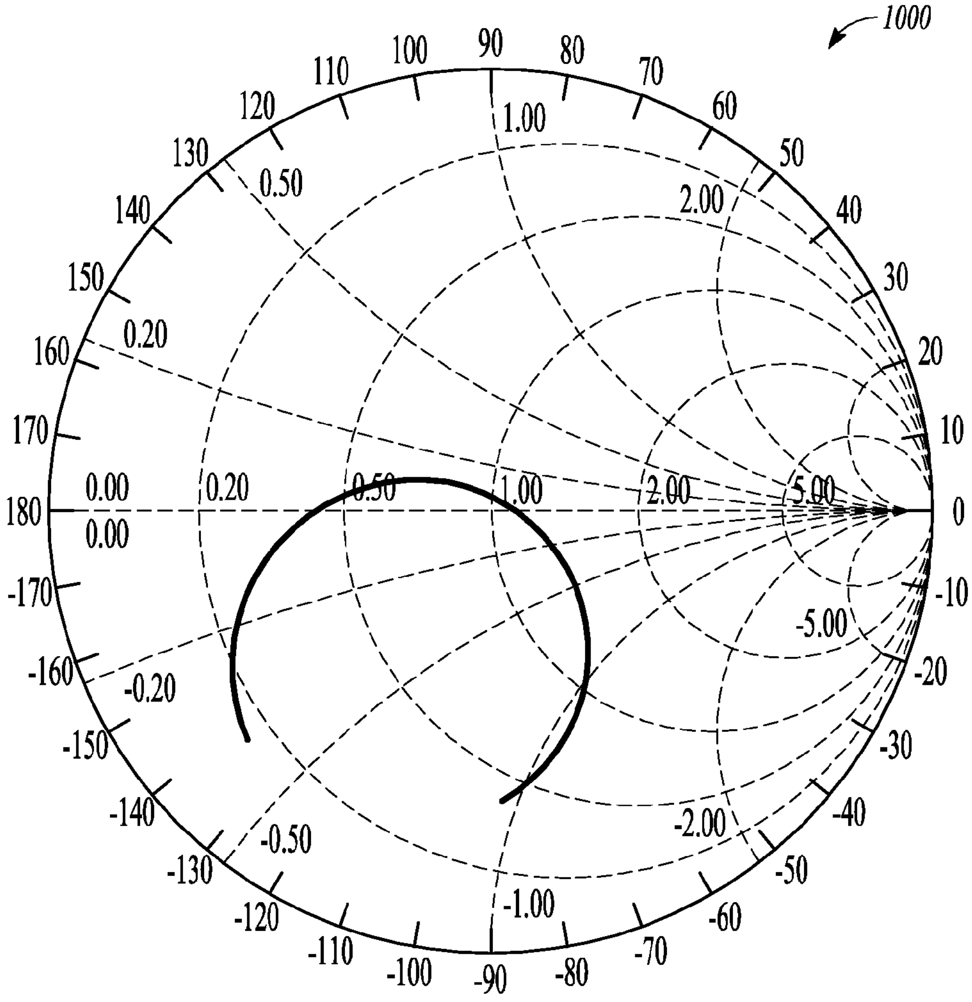
FIG. 10 illustrates generally an illustrative example of an impedance Smith Chart simulated for the antenna configuration of FIG. 8.

FIG. 10 illustrates generally an illustrative example of an impedance Smith Chart 1000 simulated for the antenna configuration of FIG. 8, showing an impedance approaching the unit real impedance (e.g., 50 ohms) at the center of the plot, corresponding to the return loss plot of FIG. 9. In an example, another desired input impedance can be specified, and one or more parameters of the antenna configuration can be adjusted to provide such an input impedance (e.g., using the CPW structure of FIGS. 7-8, or a discrete matching network, changing the lengths of one or more of the first or second conductors, adjusting a lateral spacing between the first or second conductors, adjusting a proportion of the length of the CPW versus the non-CPW portion of the first conductor, adjusting one or more flap lengths as shown in FIG. 8, or adjusting one or more other parameters).

FIG. 11 illustrates generally an example 1100 of a dielectric housing including a first and a second flexible conductor located on a curved interior surface of the housing 1116, such as illustrating the antenna configuration of FIG. 7 when conformed to the interior surface of the housing 1116. As in the example of FIG. 6, the housing 1116 need not be perfectly spherical or circular. The first conductor 1102 and the second conductor 1112 can be flexible, such as adhered or attached to a flexible dielectric sheet as discussed in the other examples of FIGS. 2-3, or FIGS. 7-8, conforming to a curved interior surface of the housing 1116. In an example, the antenna can include first or second flaps 1128A-B, or a third flap 1114. In a simulation of an illustrative example of the antenna assembly shown in FIG. 11, a gain of about −6 dB can be provided throughout the region above the horizon, such as a horizon defined by an at least quarter-wavelength ground plane located at the base of the hemispherical dielectric housing 1116.

The assembly of the examples of FIGS. 6 and 11 can be coupled to a wireless communication circuit, such as for use in whole-sky satellite communication, providing a terrestrially-located antenna assembly that can be attached to a vehicle, an aircraft, or one or more other locations. In an illustrative example, such as corresponding to the simulation results of FIGS. 4-5 and 9-10, the overall length of the antenna conductors can be about 17 inches, and the half-circumference of the interior surface of the hemispherical dielectric housing can be about 18 inches, such as to provide a center frequency (e.g., a minimum return loss) at a frequency between about 140 MHz and 145 MHz.

While the examples of FIGS. 6 and 11 include examples having antenna conductors coupled to the curved interior surface of the dielectric housing 1116, the present inventors have recognized that a generally non-planar antenna configuration can be used to move one or more nulls below the horizon, such as a piece-wise linear configuration located within a dielectric housing 1116, or including an antenna embedded or contained within the dielectric material of the housing 1116, or including one or more other antenna configurations. For example, the housing 1116 need not provide the mechanical support for the antenna in a non-planar configuration, but can serve as a cover protecting the antenna from the surrounding environment.

Figure 12:
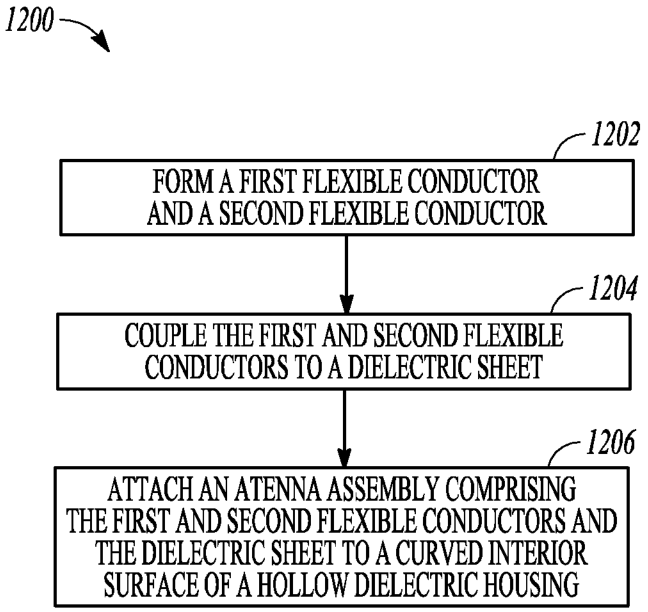
FIG. 12 illustrates generally a technique that can include forming an antenna assembly including first and second flexible conductors coupled to a dielectric sheet.

FIG. 12 illustrates generally a technique 1200 that can include forming an antenna assembly or other apparatus including first and second flexible conductors coupled to a dielectric sheet. For example, at 1202, a first flexible conductor and a second flexible conductor can be formed, such as including one or more of the flexible conductors shown in the examples of FIG. 2-3, 6, 7-8, or 11. At 1204, the first and second flexible conductors can be adhered, attached, or otherwise coupled to a dielectric sheet, such as a polyimide film or other material as discussed in the examples above. At 1206, an antenna assembly comprising the first and second flexible conductors and the dielectric sheet can be attached to a curved interior surface of a hollow dielectric housing. In an example, such apparatus can be used to wireless transfer information electromagnetically between the terrestrially-located apparatus and a satellite, such as using a VHF range of frequencies.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An antenna assembly, comprising:

a flexible dielectric sheet;

a first flexible conductor coupled to the flexible dielectric sheet;

a second flexible conductor coupled to the flexible dielectric sheet;

a matching section electrically coupled to the first and second conductors;

a hollow dielectric housing having a curved interior surface;

wherein the first and second flexible conductors are sized, shaped, and laterally spaced a specified distance from each other to provide a specified input impedance corresponding to a specified range of operating frequencies for use in wireless information transfer between the antenna assembly and a satellite, when the first and second flexible conductors are electrically coupled to a wireless communication circuit via the matching section;

wherein the dielectric sheet and the first and second flexible conductors are located along the curved interior surface of the hollow dielectric housing following an arc-shaped path along the curved interior surface; and wherein one or more of the first or second flexible conductors is configured to electrically connect the antenna assembly to the communication circuit board assembly using a direct board-to-board interconnect without requiring a connector assembly between the antenna assembly and the communication printed circuit board assembly.

2. The antenna assembly of claim 1, wherein the curved interior surface of the dielectric housing comprises a hemispherical shell.

3. The antenna assembly of claim 1, wherein the dielectric housing comprises a material having a relative dielectric constant greater than air.

4. The antenna assembly of claim 1, wherein the flexible dielectric sheet, and the first and second flexible conductors comprise a flexible printed circuit board assembly.

5. The antenna assembly of claim 4, wherein the matching section comprises a discrete component electrically and mechanically coupled to the flexible printed circuit board assembly.

6. The antenna assembly of claim 4, wherein the flexible dielectric sheet includes a polyimide film.

7. The antenna assembly of claim 4, wherein the printed circuit board assembly is adhesively coupled to the interior of the dielectric housing.

8. The antenna assembly of claim 1, wherein the matching section comprises a coplanar waveguide.

9. The antenna assembly of claim 8, wherein the coplanar waveguide is configured to be about an eighth of a wavelength long, the wavelength corresponding to an effective dielectric constant including a contribution from the flexible dielectric sheet and the hollow dielectric housing.

10. The antenna assembly of claim 1, wherein the specified range of frequencies is within a VHF range of frequencies between about 30 MHz and about 300 MHz.

11. The antenna assembly of claim 9, wherein the specified range of frequencies includes a range from about 135 MHz to about 150 MHz.

12. The antenna assembly of claim 1, wherein one or more of the lateral distance between the first and second conductors, a length of the first conductor, or a length of the second conductor is specified to provide a double-resonant response, including a first resonance corresponding to a specified uplink frequency, and a second resonance corresponding to a specified downlink frequency.

13. The antenna assembly of claim 1, wherein the first flexible conductor includes a first trace comprising a center portion of a coplanar waveguide;

wherein the second conductor comprises a first and a second region, each region respectively located laterally adjacent to the first trace and symmetric about an axis following the first trace to provide respective coplanar return conductors adjacent to the center portion of the coplanar waveguide; and wherein the second conductor comprises a first and a second conductive flap, each conductive flap respectively electrically coupled to the respective first or second region via respective traces.

14. The antenna assembly of claim 13, wherein the first flexible conductor includes a distally-located third flap at the end of the first flexible conductor opposite the matching section.

15. The antenna assembly of claim 14, wherein one or more of the first, second, or third flaps includes a cut-away portion configured to adjust an input impedance corresponding to a specified range of frequencies used for wireless information transfer.

16. The antenna assembly of claim 1, comprising:

a rigid dielectric material mechanically attached to the portion of the dielectric sheet located at or near the direct board-to-board interconnect, the rigid dielectric material configured to mechanically anchor at least a portion of the dielectric sheet and the direct board-to-board interconnect.

17. A wireless communication apparatus, comprising:

an antenna assembly, comprising:

a flexible dielectric sheet;

a first flexible conductor coupled to the flexible dielectric sheet;

a second flexible conductor coupled to the flexible dielectric sheet;

a matching section electrically coupled to the first and second conductors; and a hollow dielectric housing having a curved interior surface comprising a hemispherical shell;

a wireless communication circuit electrically coupled to the antenna assembly via the matching section, the wireless communication circuit configured to transfer information wirelessly between the apparatus and a satellite, within a specified range of operating frequencies, using the antenna assembly;

wherein the first and second flexible conductors are sized, shaped, and laterally spaced a specified distance from each other to provide a specified input impedance corresponding to the specified range of operating frequencies;

wherein the dielectric sheet and the first and second flexible conductors are located along the curved interior surface of the hollow dielectric housing following an arc-shaped path along the curved interior surface; and wherein the flexible dielectric sheet, and the first and second flexible conductors comprise a flexible printed circuit board assembly.

18. A method, comprising:

forming an antenna assembly comprising:

forming a first flexible conductor and a second flexible conductor; and coupling the first and second flexible conductors to a dielectric sheet;

attaching the antenna assembly to a curved interior surface of a hollow dielectric housing comprising a hemispherical shell;

wherein the first and second flexible conductors are sized, shaped, and laterally spaced a specified distance from each other to provide a specified input impedance corresponding to a specified range of operating frequencies for use in wireless information transfer between the antenna assembly and a satellite when the antenna assembly is coupled to a wireless communication circuit via a matching structure; and wherein the dielectric sheet and the first and second flexible conductors are located along the curved interior surface of the hollow dielectric housing following an arc-shaped path along the curved interior surface.

19. The method of claim 18, comprising electrically coupling the antenna assembly to the wireless communication circuit via the matching structure; and wirelessly transferring information between the antenna and a satellite using the specified range of frequencies.

20. An antenna assembly, comprising:

a flexible dielectric sheet;

a first flexible conductor coupled to the flexible dielectric sheet;

a second flexible conductor coupled to the flexible dielectric sheet;

wherein the first flexible conductor includes a first trace comprising a center portion of a coplanar waveguide;

wherein the second conductor comprises a first and a second region, each region respectively located laterally adjacent to the first trace and symmetric about an axis following the first trace to provide respective coplanar return conductors adjacent to the center portion of the coplanar waveguide;

wherein the second conductor comprises a first and a second conductive flap, each conductive flap respectively electrically coupled to the respective first or second region via respective traces; and wherein the dielectric sheet and the first and second flexible conductors are configured to be located along a curved interior surface of a hollow dielectric housing, following an arc-shaped path along the curved interior surface.

* * * * *